(12) United States Patent
Anderson et al.

(10) Patent No.: US 8,857,255 B2
(45) Date of Patent: Oct. 14, 2014

(54) MOISTURE RESISTANT AIR DATA PROBES

(75) Inventors: Matthew P. Anderson, Burnsville, MN (US); Scott J. Braun, Lakeville, MN (US); Jason R. Danner, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 86 days.

(21) Appl. No.: 13/591,532

(22) Filed: Aug. 22, 2012

(65) Prior Publication Data

US 2014/0053644 A1    Feb. 27, 2014

(51) Int. Cl.
*G01P 13/00*    (2006.01)

(52) U.S. Cl.
USPC ......................... 73/170.02; 73/180

(58) Field of Classification Search
None
See application file for complete search history.

(56) References Cited

U.S. PATENT DOCUMENTS

| | | | |
|---|---|---|---|
| 2,404,978 A | | 7/1946 | Morton |
| 5,406,839 A | * | 4/1995 | Leblond et al. ................ 73/180 |
| 5,458,008 A | * | 10/1995 | Rassatt ...................... 73/861.68 |
| 5,616,861 A | * | 4/1997 | Hagen ............................ 73/180 |
| 6,076,963 A | * | 6/2000 | Menzies et al. ............... 374/138 |
| 6,490,510 B1 | * | 12/2002 | Choisnet ......................... 701/14 |
| 7,124,630 B2 | * | 10/2006 | Hanson et al. ............ 73/170.02 |
| 2003/0051546 A1 | * | 3/2003 | Collot et al. ............... 73/170.02 |
| 2004/0237641 A1 | * | 12/2004 | Hanson et al. ............ 73/170.02 |
| 2005/0011285 A1 | * | 1/2005 | Giterman ................... 73/861.65 |
| 2008/0250884 A1 | * | 10/2008 | Braun et al. ................ 73/866.5 |

FOREIGN PATENT DOCUMENTS

| | | |
|---|---|---|
| EP | 2093575 A2 | 8/2009 |
| FR | 1485502 A | 6/1967 |

OTHER PUBLICATIONS

Extended European Search Report dated Nov. 20, 2013 issued on corresponding European Patent Application No. EP13180090.6.

* cited by examiner

*Primary Examiner* — Andre Allen
(74) *Attorney, Agent, or Firm* — Edwards Wildman Palmer LLP; Scott D. Wofsy; Alicia J. Esposito

(57) ABSTRACT

An air data probe includes a probe head. The probe head defines a longitudinal axis with a forward tip and aft base and includes a wall tap port inlet defined in the probe head aft between the forward tip and the aft base. The wall tap port inlet opens on an angle relative to the longitudinal axis, wherein the wall tap port inlet has an elongated inlet perimeter configured to resist the formation of a meniscus, or otherwise reduce moisture induced pressure errors.

20 Claims, 4 Drawing Sheets

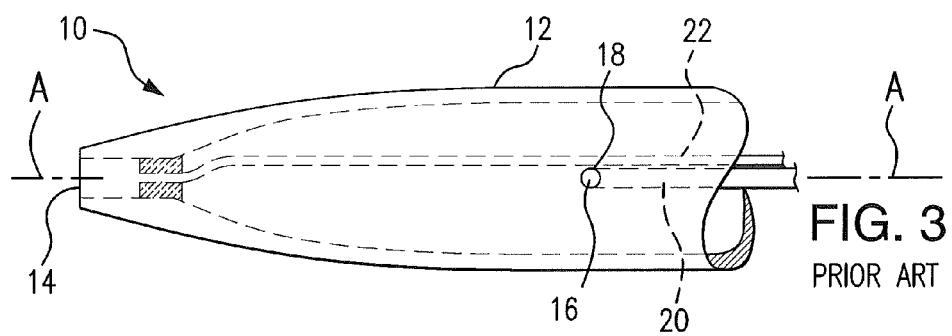
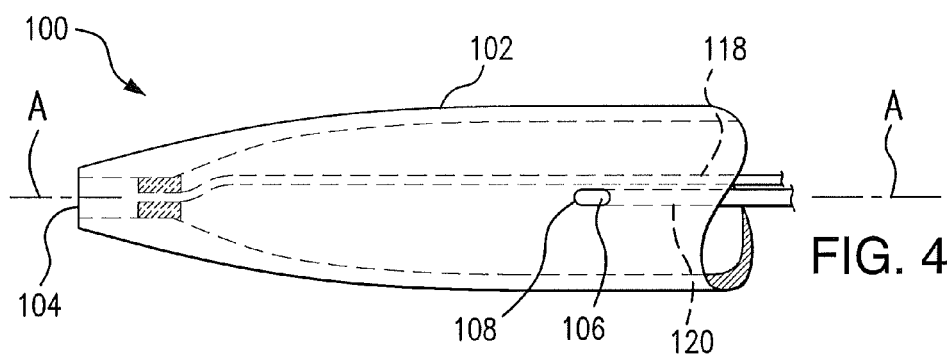
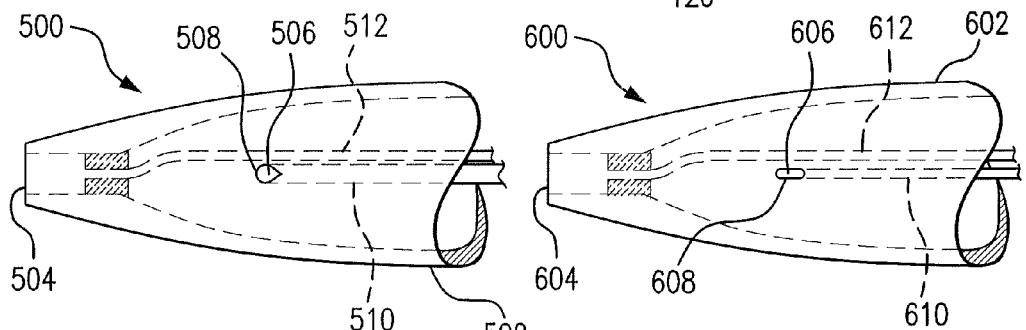

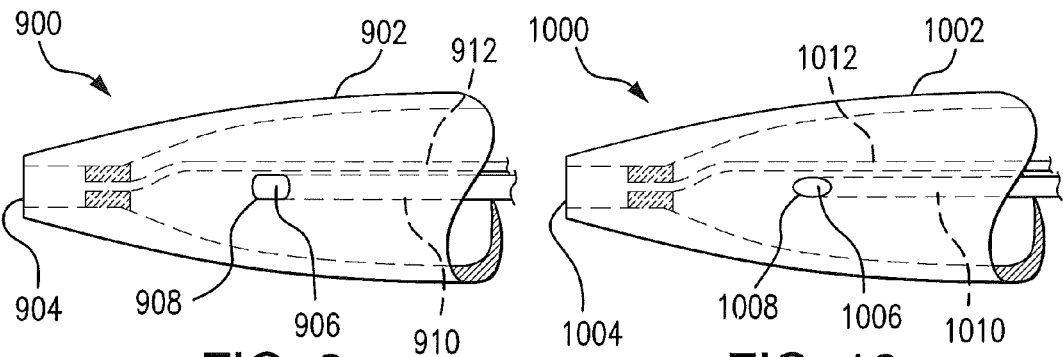
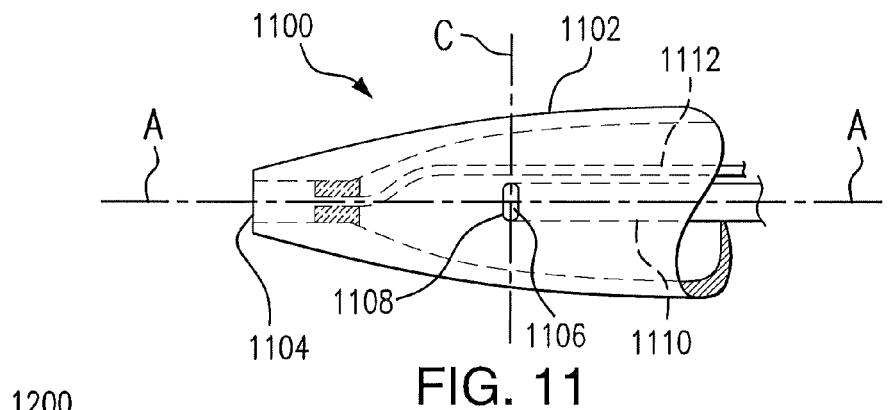
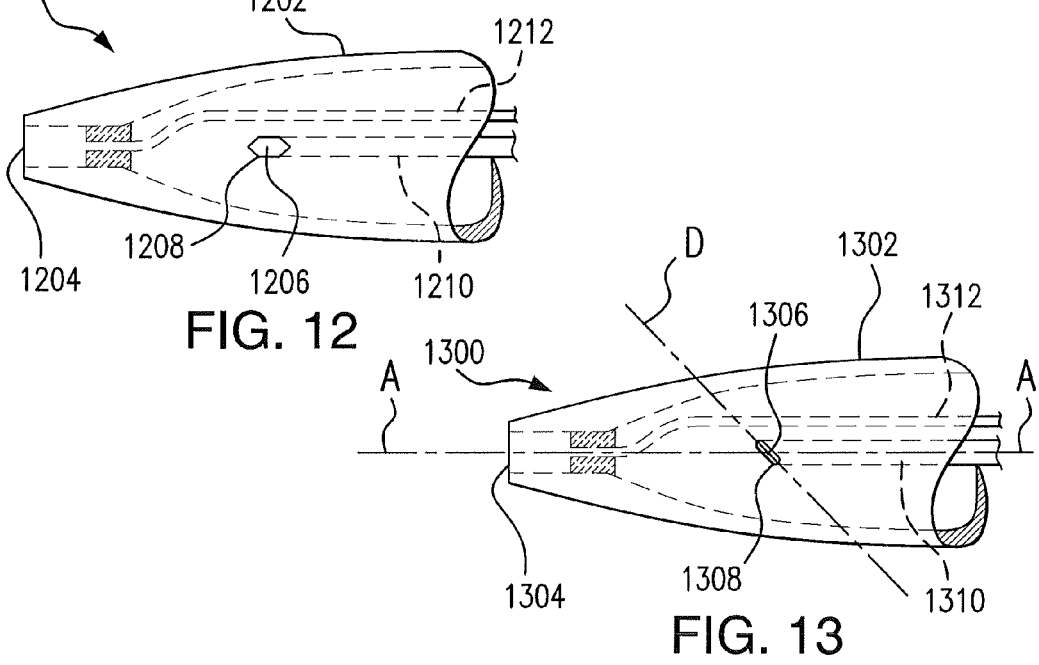

MOISTURE RESISTANT AIR DATA PROBES

BACKGROUND OF THE INVENTION

1. Field of the Invention

The present invention relates to air data probes, and more particularly to moisture resistant inlets for air data probes.

2. Description of Related Art

A variety of air data probe devices are known in the art for aircraft flight control. Of such devices, many are directed to measuring pitot pressure, static pressure, local angle of attack pressures, and angle of sideslip pressures as parameters for calculating pressure altitude, altitude rate, airspeed, Mach number, angle of attack, and angle of sideslip. Air data probes can also provide data for secondary purposes including engine control, artificial feel, cabin pressure differential, and more.

The air data probe typically includes one or more static pressure ports located on the side of the probe head integral to the probe's surface which sense the atmospheric pressure outside of the aircraft, ideally without being influenced by pressure variances caused by movement of the aircraft. Static pressure is an important parameter that is utilized in aircraft for numerous purposes including the determination of altitude, altitude rate, airspeed and airspeed rate, which last-mentioned parameters are, in turn, used as inputs to various other devices such as flight management systems, autopilots, ground proximity warning systems and wind shear detectors.

FIG. 3 shows a portion of an air data probe 10 that is representative of the prior art. Air data probe 10 includes a probe head 12, an impact port inlet 14 opening along the longitudinal axis A of the probe head 12, a wall tap port inlet 16 with a circular inlet perimeter 18 and a plurality of conduits 20, 22 for fluid communication from port inlets 14 and 16 to internal components.

While the air data probe 10 represents the state of the art, during atmospheric moisture conditions, it is possible for the air data probe 10 to have pressure sensing measurement errors due to moisture being present on the surface of the air data probe 10 and also due to moisture being ingested into the impact port inlet 14 and wall tap port inlet 16. Such moisture includes solid and liquid moisture. During ground operation and in flight, atmospheric moisture can accumulate around and in pressure measuring ports. The wall tap port inlet 16 and other associated ports of an air data probe 10 can sometimes develop menisci, due to moisture accumulation, which affect the accuracy of the sensed pressures, and therefore affect the accuracy of the determined air speed, altitude, or other measured fluid dynamic characteristic.

Such conventional methods and systems generally have been considered satisfactory for their intended purpose. However, there remains an ever present need to advance the state of the art for reducing moisture meniscus formation in the wall tap port inlets of air data probes. There also remains a need in the art for methods and systems that are inexpensive and easy to make and use for reducing moisture accumulation for air data probes. The present invention provides a solution for these problems.

SUMMARY OF THE INVENTION

The subject invention is directed to a new and useful air data probe. The air data probe includes a probe head. The probe head defines a longitudinal axis with a forward tip and an aft base and includes a wall tap port inlet defined in the probe head between the forward tip and the aft base. The wall tap port inlet opens on an angle relative to the longitudinal axis, wherein the wall tap port inlet has an elongated inlet perimeter configured to resist the formation of a meniscus, or otherwise reduce moisture induced pressure errors.

In accordance with certain embodiments, the shape of the elongated inlet perimeter is a teardrop shape, a racetrack shape, an egg shape, a polygonal shape, an elliptical shape or any other suitable elongated shape. The elongated inlet perimeter can be elongated in a direction parallel to the longitudinal axis. The elongated inlet perimeter can be elongated along a surface of the probe head in a lateral plane, wherein the lateral plane is perpendicular to the longitudinal axis. The air data probe can include a first conduit and an impact port, wherein the first conduit can fluidly connect the impact port inlet to a first outlet fixture. The air data probe can include a second conduit fluidly connecting the wall tap port inlet to a second outlet fixture. The wall tap port inlet can be configured for use in calculating angle of attack, angle of sideslip, static pressure, or any other suitable aerodynamic characteristics. Further, the air data probe can be a pitot-static pressure probe.

In accordance with certain embodiments, the elongated inlet perimeter of the wall tap port inlet has a first dimension in a first direction and a second dimension in a second direction. The first and second dimensions are perpendicular to one another and the first dimension and second dimension are different such that the elongated inlet perimeter of the wall tap port inlet is elongated along the surface of the probe head in a plane that bisects the probe head, and wherein the difference between the first dimension and second dimension of the elongated inlet perimeter is configured to resist the formation of a meniscus, or otherwise reduce moisture induced pressure errors.

The invention also includes a method of manufacturing an air data probe. The method includes forming a probe head, wherein the probe head defines a longitudinal axis with a forward tip and an aft base. The method further includes forming a wall tap port inlet defined in the probe head between the forward tip and the aft base. The wall tap port inlet opens on an angle relative to the longitudinal axis. Forming the wall tap port inlet includes forming the elongated inlet perimeter for the wall tap port inlet. The elongated inlet perimeter of the wall tap port inlet can be formed in any of the shapes described above. Forming the elongated inlet perimeter of the wall tap port inlet can include plunging an end mill into the probe head aft of the impact port inlet and moving the end mill relative to the probe head to form the elongated inlet perimeter of the wall tap port inlet.

These and other features of the systems and method of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 3 is a schematic plan view of a prior art air data probe, showing a portion of the probe head and the circular inlet perimeter of the wall tap port inlet;

FIGS. 4 through 13 are schematic plan views of exemplary embodiments of air data probes, showing for each a portion of the probe head constructed in accordance with the present invention wherein each embodiment has a different meniscus resistant wall tap port inlet shape;

DETAILED DESCRIPTION OF THE PREFERRED EMBODIMENTS

Figure 1:
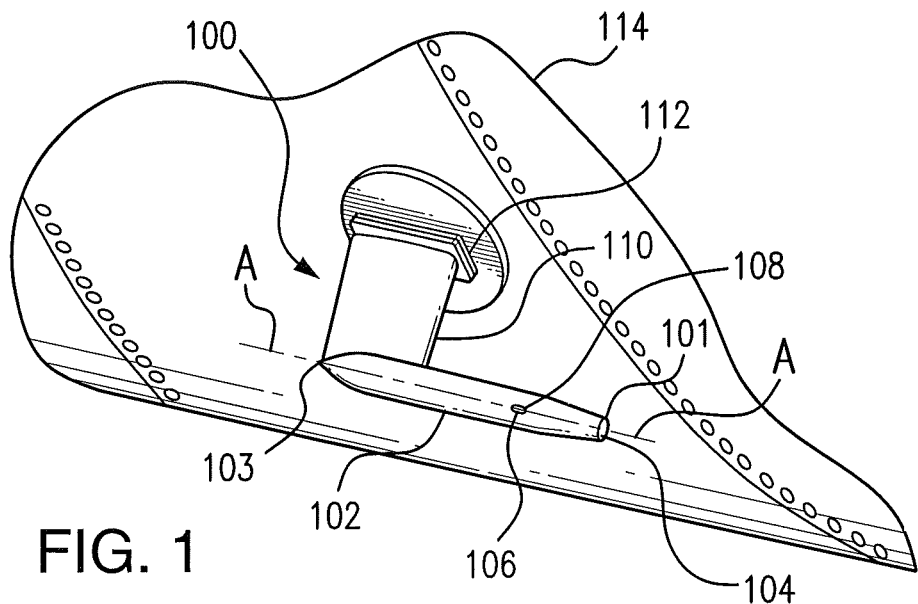
FIG. 1 is a perspective view of an exemplary embodiment of an air data probe constructed in accordance with the present invention, showing the probe mounted to an aircraft.

Reference will now be made to the drawings wherein like reference numerals identify similar structural features or aspects of the subject invention. For purposes of explanation and illustration, and not limitation, a partial view of an exemplary embodiment of an air data probe in accordance with the invention is shown in FIG. 1 and is designated generally by reference character 100. Other embodiments of air data probes in accordance with the invention or aspects thereof, are provided in FIGS. 2 and 4-15 as will be described.

As depicted in FIG. 1, the air data probe 100 includes a strut 110 with a probe head 102 extending therefrom. Strut 110 is preferably configured and adapted to extend outward from the skin of an aircraft 114 to allow the air data probe 100 to aerodynamically measure the desired air flow properties outside the aircraft 114. Air data probe 100 includes baseplate 112 situated below strut 110 for attaching air data probe 100 to aircraft 114. The probe head 102 defines a longitudinal axis A with a forward tip 101 and an aft base 103, and includes an impact port inlet 104 opening along the longitudinal axis A and a wall tap port inlet 106 defined in the probe head 102 between forward tip 101 and aft base 103. The wall tap port inlet 106 opens on an angle relative to the longitudinal axis A, i.e. perpendicular to longitudinal axis A. Wall tap port inlet 106 has an elongated, non-circular inlet perimeter 108.

Those skilled in the art will readily appreciate that a probe head, e.g. probe head 102, constructed in accordance with the present invention does not need to include a strut 110. For example, air data probes, e.g. air data probe 100, can be boom style probes where the probe head extends from the front of the aircraft, without departing from the spirit and scope of the invention. In addition, those skilled in the art will readily appreciate that an impact port inlet, e.g. impact port inlet 104, is not required. For example, air data probes, e.g. air data probe 100, can be used with only a wall tap port inlet, e.g. wall tap port inlet 106, without departing from the spirit and scope of the invention.

With continuing reference to FIG. 1, elongated inlet perimeter 108 allows for similar pressure accuracy and noise performance in dry air conditions to traditional circular inlets, and improved performance in atmospheric moisture conditions. The use of an elongated or non-circular inlet perimeter prevents a full meniscus from forming or only permits a weak meniscus, thereby reducing the ability of moisture to form a blockage across a pressure measuring port, such as wall tap port inlet 106, or otherwise induce a pressure error when compared with dry air measurement. This results in the atmospheric moisture having a reduced impact on air data pressure readings compared to air data probes with traditional circular port openings.

Figure 2:
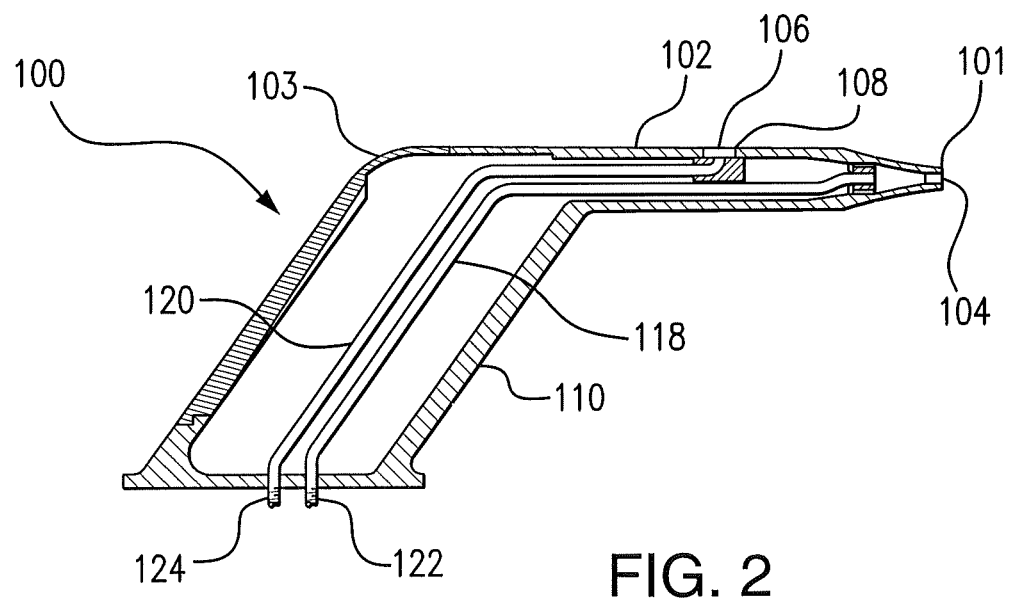
FIG. 2 is a cross sectional view of the air data probe of FIG. 1, showing the conduits passing out of the probe.

Referring now to FIG. 2, the air data probe 100 includes a probe head 102 extending from strut 110. Probe head 102 has inlets 104 and 106 that communicate with a plurality of conduits 118 and 120, respectively. Air data probe 100 includes a first conduit 118 fluidly connecting impact port inlet 104 to a first outlet fixture 122, and a second conduit 120 fluidly connecting wall tap port inlet 106 to a second outlet fixture 124. Inlets 104 and 106 are configured for air speed measurements. However, those skilled in the art will readily appreciate that any suitable combination of inlets can be used to measure pitot, static, angle of attack, angle of sideslip pressures or any other suitable aerodynamic characteristic without departing from the spirit and scope of the invention. Further, those skilled in the art will also appreciate that air data probe 100 can be a pitot-static pressure probe.

Referring now to FIGS. 4-13, probe heads 102, 502, 602, 702, 802, 902, 1002, 1102, 1202, 1302 include wall tap port inlets 106, 506, 606, 706, 806, 906, 1006, 1106, 1206, 1306 with elongated inlet perimeters 108, 508, 608, 708, 808, 908, 1008, 1108, 1208, 1308, respectively. As depicted, the shapes of elongated inlet perimeters 108, 508, 608, 708, 808, 908, 1008, 1108, 1208, 1308 have a teardrop shape, a racetrack shape, a polygonal shape, or an elliptical shape, as will be described in greater detail below. Those skilled in the art will readily appreciate that these shapes are exemplary and that any suitable non-circular shape, such as an egg shape, can be used without departing from the spirit and scope on the invention.

The embodiments shown in FIGS. 4-13 depict some elongated inlet perimeter shapes, but are not intended to be exhaustive of all possible orientations and dimensions. Additional suitable shapes include elongated inlet perimeters that have variable diameters, are smaller, less elongated, more elongated, larger, oval, variably orientated, sharper corners, more rounded corners or combinations of these features.

With continued reference to FIG. 4, elongated inlet perimeter 108 is elongated in a direction parallel to longitudinal axis A in a racetrack shape. Wall tap port inlet 106 is located on the non-tapered surface of probe head 102 so that the elongation of elongated inlet perimeter 108 is in a direction parallel to longitudinal axis A.

Figure 14:
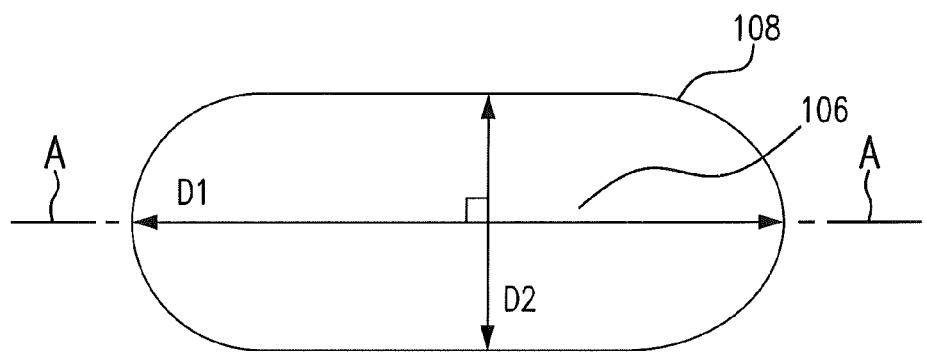
FIG. 14 is an enlarged schematic plan view of the elongated inlet perimeter of FIG. 4, showing the relationship between two dimensions.

Referring now to FIG. 14, elongated inlet perimeter 108 has a first dimension D1 in a first direction and a second dimension D2 in a second direction. The first and second dimension D1, D2 are perpendicular to one another and first dimension D1 and second dimension D2 are different from one another in length. The difference between first dimension D1 and second dimension D2 of elongated inlet perimeter 108 is configured to resist the formation of a meniscus.

Figure 15:
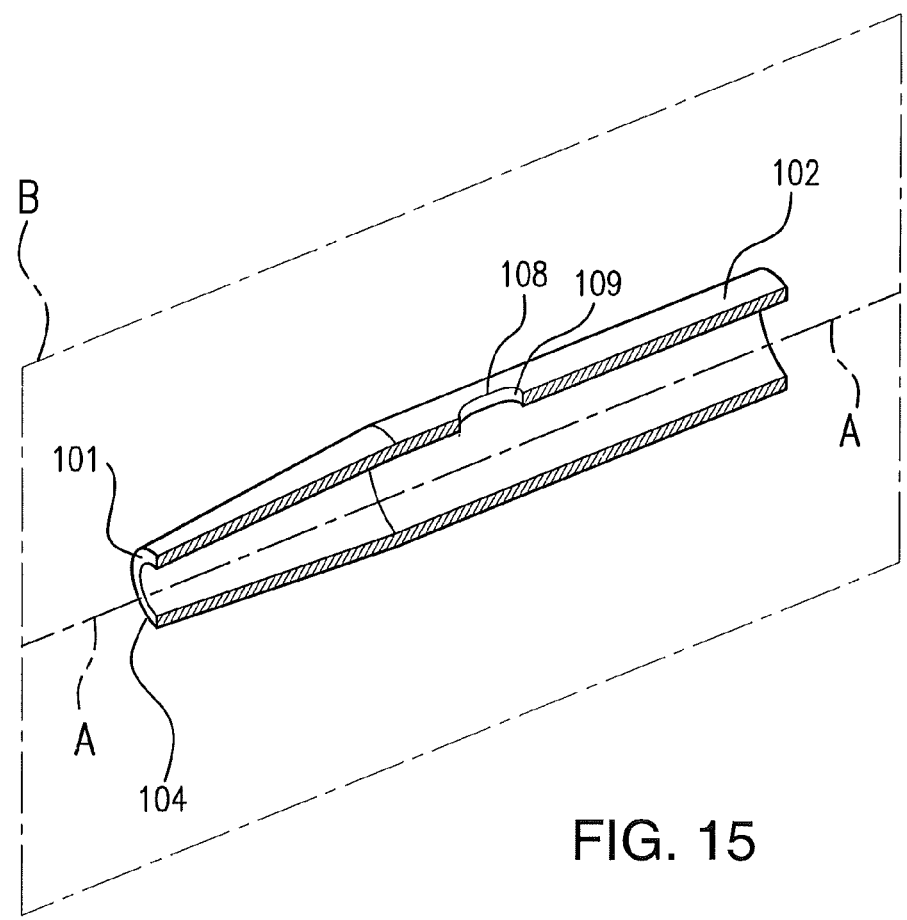
FIG. 15 is a bisected cross sectional view of the air data probe of FIG. 4, showing a plane of elongation for the elongated inlet perimeter.

As shown in FIG. 15, elongated inlet perimeter 108 of wall tap port inlet 106 is elongated along the surface of probe head 102 in plane B that bisects impact port inlet 104 and probe head 102. The wall tap port inlet 106 is located on a cylindrical portion of probe head 102 aft of the tapering of the forward tip 101 of the probe head 102. It is also contemplated that a wall tap inlet can be located on the tapered portion of the probe head as in FIGS. 5-13. Those skilled in the art will readily appreciate that the inner sides 109 can optionally be beveled or tapered.

Referring now to FIGS. 5-10 and 12, the elongated inlet perimeters 508, 608, 708, 808, 908, 1008, 1208 each have a first dimension D1 in a first direction and a second dimension D2 in a second direction, similar to elongated inlet perimeter 108 described above, and are aligned to be bisected by a plane bisecting their respective impact ports. Those having skill in the art will readily appreciate that elongated inlet perimeters 108, 508, 608, 708, 808, 908, 1008, 1108, 1208 and 1308 can be oriented on the probe head 102, 502, 602, 702, 802, 902, 1002, 1102, 1202 and 1302 in any direction along the probe surface. In addition, dimensions D1 and D2 of the elongated inlet perimeters, e.g. elongated inlet perimeter 108, can be adjusted depending on the aerodynamic performance requirements.

Referring now to FIG. 5, wall tap port inlet 506 has an elongated inlet perimeter 508 with a teardrop shape. Those skilled in the art will readily appreciate that elongated inlet perimeter 508 can vary dimensionally to be a longer, wider, narrower or shorter teardrop shape.

Referring to FIG. 6, wall tap port inlet 606 has an elongated inlet perimeter 608 with a racetrack shape. Elongated inlet perimeter 608 is similar to elongated inlet perimeter 108, however, the racetrack shape of elongated inlet perimeter 608 is proportionally longer and narrower than the racetrack shape of elongated inlet perimeter 108 of FIG. 4.

With reference now to FIG. 7, wall tap port inlet 706 has an elongated inlet perimeter 708 with a racetrack shape. Elongated inlet perimeter 708 is similar to elongated inlet perimeter 608, however, the racetrack shape of elongated inlet perimeter 708 is proportionally wider than the racetrack shape of elongated inlet perimeter 608 of FIG. 6.

Referring now to FIG. 8, wall tap port inlet 806 has an elongated inlet perimeter 808 with a racetrack shape. Elongated inlet perimeter 808 is similar to elongated inlet perimeter 708, however, the racetrack shape of elongated inlet perimeter 808 is proportionally longer than the racetrack shape of elongated inlet perimeter 708 of FIG. 7.

With reference now to FIG. 9, wall tap port inlet 906 has an elongated inlet perimeter 908 with a racetrack shape. Elongated inlet perimeter 908 is similar to the elongated inlet perimeter 708 described above, however, the racetrack shape of elongated inlet perimeter 908 is proportionally wider than the racetrack shape of elongated inlet perimeter 708 of FIG. 7.

Referring now to FIG. 10, wall tap port inlet 1006 has an elongated inlet perimeter 1008 with an ellipse shape. Elongated inlet perimeter 1008 is exemplary and those skilled in the art would readily appreciate that the ellipse shape of elongated inlet perimeter 1008 can vary dimensionally and proportionally.

Referring now to FIG. 11, elongated inlet perimeter 1108 can be elongated along a surface of probe head 1102 in a lateral plane C, wherein lateral plane C is perpendicular to longitudinal axis A. The racetrack shape of elongated inlet perimeter 1108 is similar to elongated inlet perimeter 108 shown in FIG. 4. Elongated inlet perimeter 1108, however, is orientated differently and is formed in the tapered surface of probe head 1102. Those skilled in the art will readily appreciate that the placement of wall tap port inlet 1106 in the tapered surface of probe head 1102 is exemplary and the formation of wall tap port inlet 1106 in the probe head 1102 surface can vary without departing from the spirit and scope of the invention.

With reference now to FIG. 12, wall tap port inlet 1206 has an elongated inlet perimeter 1208 with a polygonal shape. Elongated inlet perimeter 1208 is exemplary and those skilled in the art will readily appreciate that the polygonal shape of elongated inlet perimeter 1208 can vary dimensionally and proportionally, and can include more or less sides without departing from the spirit and scope of the invention.

With reference to FIG. 13, the racetrack shaped elongated perimeter 1308 of wall tap port inlet 1306 can be elongated along the surface of probe head 1302 in oblique plane D, wherein oblique plane D is oriented at an oblique angle relative to longitudinal axis A. The racetrack shape of elongated inlet perimeter 1308 is similar to elongated inlet perimeter 608 shown in FIG. 6.

The invention also includes a method of manufacturing an air data probe. The method includes forming a probe head, e.g. probe head 102, wherein the probe head defines a longitudinal axis, e.g. longitudinal axis A, with a forward tip 101 and an aft base 103. The method further includes forming a wall tap port inlet, e.g. wall tap port inlet 106, defined in the probe head between the forward tip 101 and the aft base 101, so that the wall tap port inlet opens on an angle relative to the longitudinal axis. Forming the wall tap port inlet includes forming the perimeter of the wall tap port inlet as an elongated inlet perimeter, e.g. elongated inlet perimeter 108. The elongated inlet perimeter of the wall tap port inlet can be formed in a suitable non-circular shape as described above, for resisting meniscus formation. Forming the elongated inlet perimeter of the wall tap port inlet can include plunging an end mill into the probe head between the forward tip 101 and the aft base 103 and moving the end mill relative to the probe head to form the elongated inlet perimeter of the wall tap port inlet. Those skilled in the art will readily appreciate that the mill described above is exemplary and that other suitable processes can be used to form the wall tap port inlet, such as EDM, laser cutting, laser sintering, stamping and water jet cutting.

Due to elongated inlet perimeters, e.g. elongated inlet perimeter 108, of wall tap port inlets, e.g. wall tap port inlet 106, the formation of menisci in wall tap port inlets is resisted. Therefore, the maximum pressure errors measured of an air data probe constructed in accordance with exemplary embodiments are considerably less than the maximum pressure errors measured of an air data probe constructed in accordance with the current-state-of-the-art.

The methods and systems of the present invention, as described above and shown in the drawings, provide for an elongated inlet perimeter of the wall tap port inlet with superior properties including reducing and resisting the formation of a meniscus in the wall tap port inlet. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. An air data probe comprising:
   a probe head, the probe head defining a longitudinal axis with a forward tip and aft base; and
   a wall tap port inlet defined in the probe head between the forward tip and aft base, the wall tap port inlet opening on an angle relative to the longitudinal axis, wherein the wall tap port inlet has an elongated inlet perimeter configured to reduce moisture induced pressure errors.

2. The air data probe as recited in claim 1, wherein a shape of the elongated inlet perimeter is selected from the group consisting of:
   a teardrop shape;
   a racetrack shape;
   an egg shape;
   a polygonal shape; and
   an elliptical shape.

3. The air data probe as recited in claim 1, wherein the elongated inlet perimeter is elongated in a direction parallel to the longitudinal axis.

4. The air data probe as recited in claim 1, wherein the elongated inlet perimeter is elongated along a surface of the probe head in a lateral plane, wherein the lateral plane is perpendicular to the longitudinal axis.

5. The air data probe as recited in claim 1, further comprising a first conduit and an impact port, wherein the first conduit fluidly connects the impact port inlet to a first outlet fixture.

6. The air data probe as recited in claim 1, further comprising a second conduit fluidly connecting the wall tap port inlet to a second outlet fixture.

7. The air data probe as recited in claim 1, wherein the wall tap port inlet is configured for use in calculating angle of attack.

8. The air data probe as recited in claim 1, wherein the wall tap port inlet is configured for use in calculating angle of sideslip.

9. The air data probe as recited in claim 1, wherein the wall tap port inlet is configured for use in measuring static pressure.

10. The air data probe as recited in claim 1, wherein the air data probe is a pitot-static pressure probe.

11. An air data probe comprising:
 a probe head, the probe head defining a longitudinal axis with a forward tip and aft base; and
 a wall tap port inlet defined in the probe head between the forward tip and aft base, the wall tap port inlet opening on a surface of the probe head on an angle relative to the longitudinal axis, wherein an elongated inlet perimeter of the wall tap port inlet has a first dimension in a first direction and a second dimension in a second direction, wherein the first and second dimensions are perpendicular to one another and wherein the first dimension and second dimension are different such that the elongated inlet perimeter of the wall tap port inlet is elongated along the surface of the probe head in a plane that bisects the probe head, and wherein the difference between the first dimension and the second dimension of the elongated inlet perimeter is configured to reduce moisture induced pressure errors.

12. The air data probe as recited in claim 11, wherein a shape of the elongated inlet perimeter of the wall tap port inlet is selected from the group consisting of:
 a teardrop shape;
 a racetrack shape;
 an egg shape;
 a polygonal shape; and
 an elliptical shape.

13. The air data probe as recited in claim 11, further comprising a first conduit and an impact port, wherein the first conduit fluidly connects the impact port inlet to a first outlet fixture.

14. The air data probe as recited in claim 11, further comprising a second conduit fluidly connecting the wall tap port inlet to a second outlet fixture.

15. The air data probe as recited in claim 11, wherein the wall tap port inlet is configured for use in calculating angle of attack.

16. The air data probe as recited in claim 11, wherein the wall tap port inlet is configured for use in calculating angle of sideslip.

17. The air data probe as recited in claim 11, wherein the wall tap port inlet is configured for use in measuring static pressure.

18. A method of manufacturing an air data probe, the method comprising:
 forming a probe head, the probe head defining a longitudinal axis with a forward tip and aft base; and
 forming a wall tap port inlet defined in the probe head between the forward tip and aft base, the wall tap port inlet opening on an angle relative to the longitudinal axis, wherein forming the wall tap port inlet includes forming an elongated inlet perimeter of the wall tap port inlet to have a first dimension in a first direction and a second dimension in a second direction, wherein the first and second dimension are perpendicular to one another and wherein the first dimension and second dimension are different, wherein the difference between the first dimension and the second dimension is configured to reduce moisture induced pressure errors.

19. The method as recited in claim 18, wherein forming the elongated inlet perimeter of the wall tap port inlet includes forming the elongated inlet perimeter in a shape selected from the group consisting of:
 a teardrop shape;
 a racetrack shape;
 an egg shape;
 a polygonal shape; and
 an elliptical shape.

20. The method as recited in claim 18, wherein forming the elongated inlet perimeter of the wall tap port inlet includes plunging an end mill into the probe head and moving the end mill relative to the probe head to form the elongated inlet perimeter of the wall tap port inlet.

* * * * *